United States Patent
Swanson et al.

(10) Patent No.: US 7,506,559 B2
(45) Date of Patent: *Mar. 24, 2009

(54) SHIFT MECHANISM FOR POWER TRANSMISSION ASSEMBLIES

(75) Inventors: Jeffrey Swanson, Clay, NY (US); Carl H. Vonnegut, Newton, MA (US)

(73) Assignee: Magna Powertrain USA, Inc., Troy, MI (US)

( * ) Notice: Subject to any disclaimer, the term of this patent is extended or adjusted under 35 U.S.C. 154(b) by 399 days.

This patent is subject to a terminal disclaimer.

(21) Appl. No.: 11/509,750

(22) Filed: Aug. 24, 2006

(65) Prior Publication Data

US 2007/0034031 A1 Feb. 15, 2007

Related U.S. Application Data

(63) Continuation-in-part of application No. 10/949,410, filed on Sep. 24, 2004, now Pat. No. 7,101,304.

(51) Int. Cl.
*F16H 59/00* (2006.01)
*F16H 61/00* (2006.01)
*F16H 63/00* (2006.01)

(52) U.S. Cl. .................... 74/335; 475/198; 475/303; 192/69.91; 192/84.6; 192/89.29; 180/249

(58) Field of Classification Search ............. 475/198, 475/199, 204, 206, 249, 295, 303; 74/335; 180/233, 247, 248, 249, 250; 192/69.91, 192/84.6, 89.29
See application file for complete search history.

(56) References Cited

U.S. PATENT DOCUMENTS 2,644,550 A 7/1953 Flinn
4,462,271 A 7/1984 Stieg
4,529,080 A 7/1985 Dolan
4,770,280 A 9/1988 Frost
5,193,410 A 3/1993 Stine et al.
5,460,060 A 10/1995 Nellums
5,517,876 A 5/1996 Genise et al.
5,702,321 A 12/1997 Bakowski et al.
5,743,143 A * 4/1998 Carpenter et al. ............. 74/335
5,782,328 A * 7/1998 Fogelberg et al. ............. 192/35
5,832,777 A 11/1998 Weilant
5,878,624 A 3/1999 Showalter et al.
5,951,429 A 9/1999 Eastman
6,619,153 B2 * 9/2003 Smith et al. ............... 74/473.37
7,004,875 B2 2/2006 Williams et al.
7,101,304 B2 * 9/2006 Swanson et al. ............ 475/295
2004/0069082 A1 4/2004 Koening et al.

* cited by examiner

*Primary Examiner*—David D. Le
(74) *Attorney, Agent, or Firm*—Harness, Dickey & Pierce, P.L.C.

(57) ABSTRACT

The present invention provides a shift mechanism disposed in a housing for providing operable communication between a shift actuator and a shift sleeve. The shift mechanism generally includes a shift rail, a shift fork, a first biasing member, and a second biasing member. The shift rail is slidably supported by the housing. The shift fork is slidably disposed on the shift rail and engages the shift sleeve. The first biasing member is disposed between the shift actuator and the shift rail for selectively biasing the shift rail in a first direction upon actuation of the shift actuator. The second biasing member is disposed between the housing and the shift fork for biasing the shift fork in a second direction that is substantially opposite the first direction.

34 Claims, 10 Drawing Sheets

SHIFT MECHANISM FOR POWER TRANSMISSION ASSEMBLIES

CROSS-REFERENCE TO RELATED APPLICATIONS

This application is a continuation-in-part of U.S. patent application Ser. No. 10/949,410 filed on Sep. 24, 2004, now U.S. Pat. No. 7,101,304.

FIELD OF THE INVENTION

The present invention relates to shift systems for power transfer systems and, more particularly, to an electric shift system for use in power transmission assemblies such as four-wheel drive transfer cases and power take-off units.

BACKGROUND OF THE INVENTION

It is known in the automobile industry to equip power transfer systems (e.g., manual transmissions, transfer cases and the like) with a shift system having spring loaded shift devices for completing a delayed or blocked gear or mode shift once speed synchronization or a torque break occurs. Examples of conventional spring-loaded shift systems are disclosed in U.S. Pat. Nos. 4,529,080, 4,770,280, 5,460,060 and 5,517,876. In each of these patents, a pair of springs are used to provide a bi-directional preload function for effectuating coupling of a dog-type clutch sleeve with a desired gear set. While such arrangements are satisfactory for their intended purpose, a need exists to develop simpler, more cost effective alternatives that provide the desired function while advancing the art.

SUMMARY OF THE INVENTION

Accordingly, the present invention is directed to power transmission assemblies for use in motor vehicles and which are equipped with a power-operated shift mechanism. The shift mechanism is disposed in a housing between a shift actuator and a clutch sleeve. The shift mechanism generally includes a shift rail, a shift fork, a first biasing member and a second biasing member. The shift rail is slidably supported in the housing. The shift fork is slidably supported on the shift rail and engages the clutch sleeve. The first biasing member is disposed between the shift actuator and the shift rail for selectively biasing the shift rail in a first direction upon actuation of the shift actuator. The second biasing member is disposed between the housing and the shift fork for biasing the shift fork in a second direction that is substantially opposite the first direction.

Another aspect of the present invention provides a transfer case for a four-wheel drive vehicle generally including a housing, an input shaft, a first output shaft, a second output shaft, a gearset, a mode sleeve, a shift actuator and a shift mechanism. The input shaft, first output shaft and second output shaft are rotatably supported by the housing. The gearset is driven by the input shaft and includes a first rotary output driving the first output shaft and a second rotary output driving the second output shaft. The mode sleeve is moveable for selectively coupling the first output shaft to the second output shaft. The shift mechanism is operably disposed between the shift actuator and the mode sleeve. The shift mechanism generally includes a shift rail, a shift fork, a first biasing member and a second biasing member. The shift rail is slidably supported by the housing. The shift fork is slidably supported on the shift rail and engages the mode sleeve. The first biasing member is disposed between the shift actuator and the shift rail for selectively biasing the shift rail in a first direction in response to the shift actuator being actuated. The second biasing member is disposed between the housing and the shift fork for biasing the shift fork in a second direction that is substantially opposite to the first direction.

The electrically-shifted mode shift system of the present invention is well-suited for use in power transmission assemblies for shifting between first and second drive modes or gear ratios.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

In general, the present invention is directed to a power-operated shift system of the type used in motor vehicle power transmission devices for effectuating translational movement of a coupling member to shift between gear ratios or drive modes.

Figure 1:
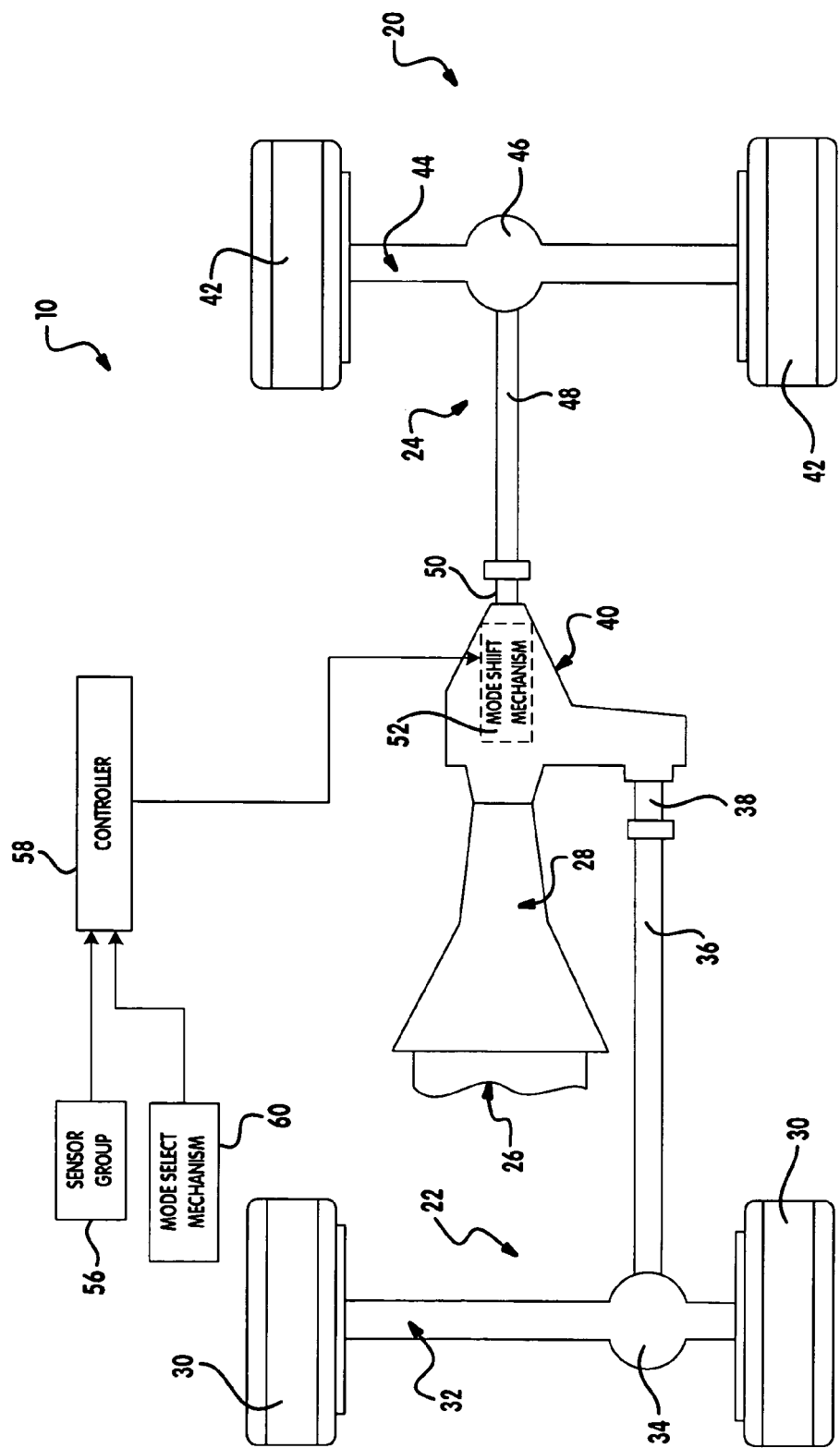
FIG. 1 is a schematic illustration of a four-wheel drive vehicle equipped with an electric shift transfer case.

FIG. 1 depicts a four-wheel drive vehicle 10 generally including a front driveline 22, a rear driveline 24, and a power source, such as an engine 26 (partially shown). Engine 26 provides rotary power (i.e., drive torque) to front and rear drivelines 22, 24 via a transmission 28. Transmission 28 may be either a manual or automatic shifting transmission. Front driveline 22 includes a pair of front wheels 30 connected to opposite ends of a front axle assembly 32 having a front differential 34. Front differential 34 is coupled to one end of a front prop shaft 36, the opposite end of which is coupled to a front output shaft 38 of a power transmission assembly, hereinafter referred to as transfer case 40. Similarly, rear driveline 24 includes a pair of rear wheels 42 connected to opposite ends of a rear axle assembly 44 having a rear differential 46. Rear differential 46 is coupled to one end of a rear prop shaft 48, the opposite end of which is coupled to a rear output shaft 50 of transfer case 40. Transfer case 40 is equipped with a mode shift mechanism 52 that is operable to control a mode of operation of transfer case 40. Actuation of mode shift mechanism 52 is controlled by a controller 58. Controller 58 generates control signals and responds to a passenger operating a mode select mechanism 60 within the passenger compartment of vehicle 10.

Figure 2:
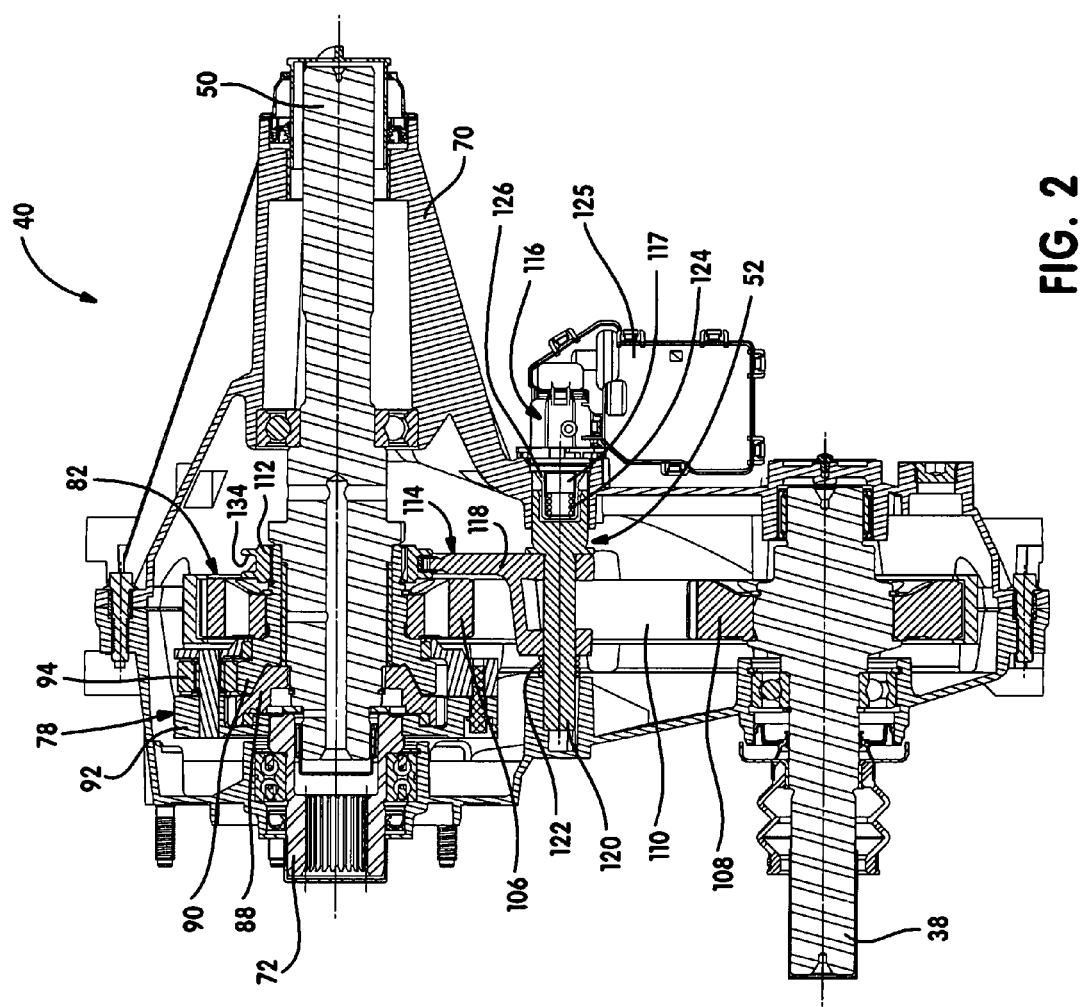
FIG. 2 is a cross-sectional view of an exemplary electric shift transfer case according to the present invention.

FIG. 2 depicts an exemplary construction for transfer case 40 which is generally shown to include a housing 70, an input shaft 72 rotatably supported from housing 70, rear output shaft 50 rotatably supported between input shaft 72 and housing 70, front output shaft 38 rotatably supported from housing 70, a differential gearset 78 driven by input shaft 72 and a transfer mechanism 82 driving front output shaft 38. As will be detailed, mode shift mechanism 52 is operable for selectively shifting differential 78 between operation in either of a first or "open" drive mode or a second or "locked" drive mode.

Differential 78 includes a first sun gear 88, a second sun gear 90, a carrier 92 and meshed sets of planetary gears 94. Carrier 92 is driven by input shaft 72. The meshed sets of planetary gears 94 are rotatably supported on pins on carrier 92 and include a plurality of first plant gears meshed with first sun gear 88 and a plurality of second plant gears meshed with second sun gears 90. As seen, first sun gear 88 is drivingly coupled to rear output shaft 50 while second sun gear 90 is rotatably supported on rear output shaft 50 and drivingly coupled to transfer mechanism 82.

Transfer mechanism 82 is shown to include a first sprocket 106 fixed to second sun gear 90, a second sprocket 108 fixed to front output shaft 38 and a power chain 110 connecting first sprocket 106 to second sprocket 108. Mode shift mechanism 52 includes a mode sleeve 112, a shift fork assembly 114 and a power-operated actuator assembly 116. Mode sleeve 112 is splined to second sun gear 90 for axial movement thereon between a first mode position (shown in FIGS. 2 and 3A) and a second mode position (shown in FIG. 3B). With mode sleeve 112 in its first mode position, differential 78 operates in its open mode such that rear output shaft 50 and front output shaft 38 are permitted to have different rotational velocities. With mode sleeve 112 in its second mode position, differential 78 operates in its locked mode such that rear output shaft 50 and front output shaft 38 are coupled to rotate at a common rotational velocity. To move mode sleeve 112 between its first and second mode positions, actuator assembly 116 is actuated by controller 58 in response to a mode signal generated by mode select mechanism 60.

Shift fork assembly 114 includes a shift fork 118, a shift rail 120, a return spring 122, an actuator spring 124 and a plunger 126. Power-operated actuator assembly 116 includes a linear actuator 125 having a bi-directionally displaceable actuation member 117. In an exemplary embodiment, linear actuator 125 includes an electric motor that is operable for linearly driving a ball screw mechanism which, in turn, translates actuation member 117. An exemplary ball screw mechanism is described in commonly owned U.S. Pat. No. 6,725,990, the disclosure of which is hereby incorporated by reference. However, it should be appreciated that alternative linear actuators are intended to be within the scope of the present invention.

Figure 3A:
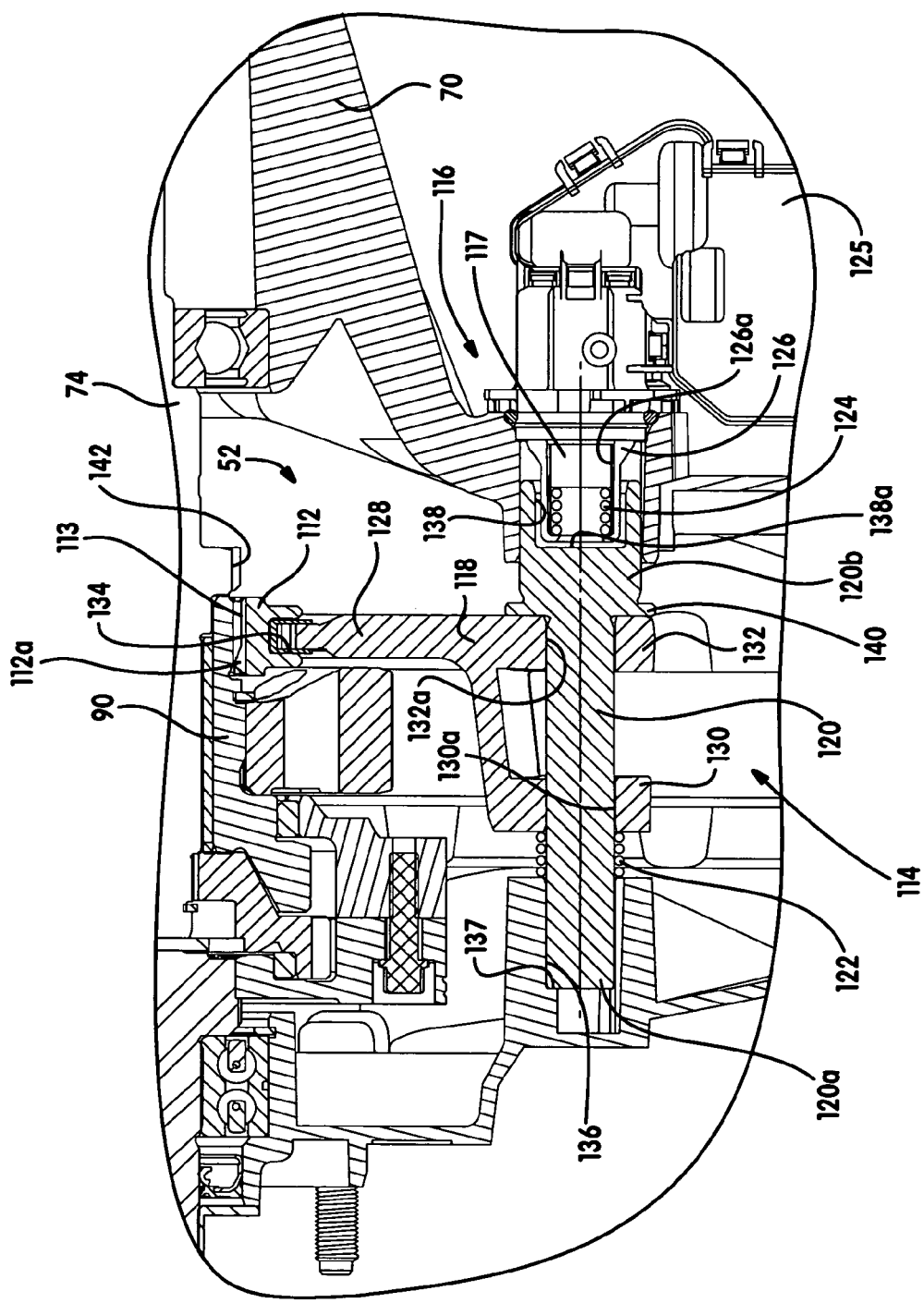
FIG. 3A is a cross-sectional detail view of a mode shift system associated with the transfer case of FIG. 2 with its mode clutch operably located in a first mode position.
Figure 3B:
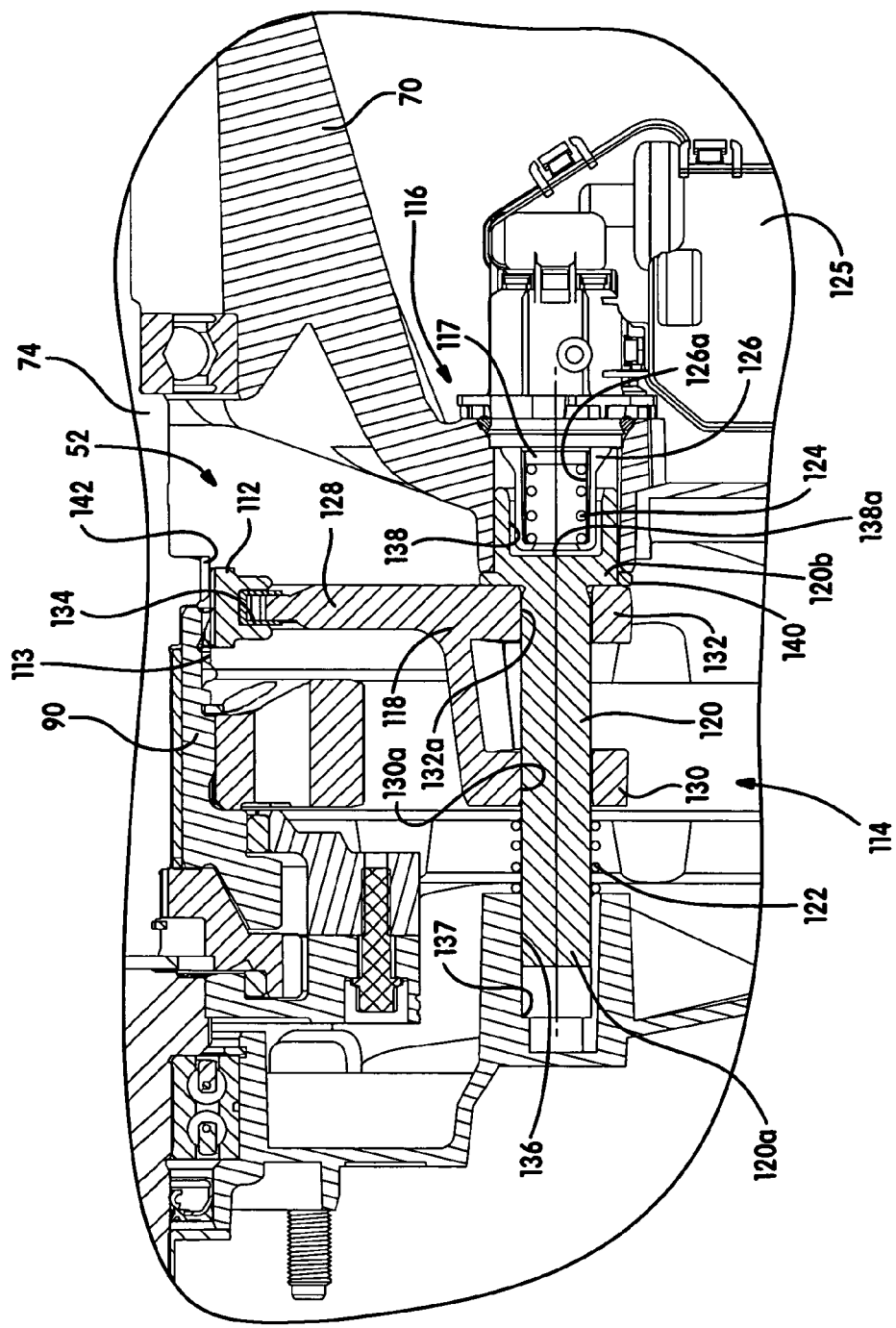
FIG. 3B is a cross-sectional detail view of the mode shift system with its mode clutch shown operably located in a second mode position.

FIGS. 3A and 3B show shift fork 118 to include an arm 128, a first finger 130 and a second finger 132. An end section of arm 128 is slidably disposed in an annular channel 134 formed in mode sleeve 112. First and second fingers 130 and 132 include coaxial apertures 130a and 132a through which rail 120 extends such that shift fork 118 is slidably disposed on shift rail 120. Shift rail 120 includes a first end 120a and a second end 120b. First end 120a is supported in a blind bore 136 formed in housing 70 of transfer case 40. Blind bore 136 includes a radial shoulder 137 formed therein. Return spring 122 is disposed on shift rail 120 between housing 70 and first finger 130 of shift fork 118. Second end 120b of shift rail 120 includes a blind bore 138 and a radial flange 140. Blind bore 138 of shift rail 120 receives plunger 126. Plunger 126 includes a cup-shaped member having an opening 126a containing actuator spring 124 and which is adapted to selectively receive displaceable actuation member 117 of actuator assembly 116.

As stated above, FIG. 3A shows mode sleeve 112 of mode shift mechanism 52 in its first mode position. To locate mode sleeve 112 in its first mode position, actuation member 117 of actuator assembly 116 is extended into opening 126a of plunger 126, thereby compressing actuator spring 124 against plunger 126. This causes plunger 126 to be biased toward engagement with shift rail 120. In particular, plunger 126 engages an end surface 138a of blind bore 138 in second end 120b of shift rail 120, thereby biasing shift rail 120 to the left, relative to the view illustrated. Such biasing of shift rail 120 causes flange 140 to engage second finger 132 of shift fork 118 which, in turn, causes first finger 130 of shift fork 118 to compress return spring 122 against housing 70. In this mode position, arm 128 positions internal spline teeth 112a on mode sleeve 112 in absolute engagement only with external clutch teeth 113 of second sun gear 90. Furthermore, it should be noted that in the first mode position illustrated, first end 120a of shift rail 120 bottoms out and engages shoulder 137 in blind bore 136 of housing 70. Shoulder 137 therefore provides the necessary reaction force for actuation spring 124 to continue biasing mode shift mechanism 52 into this first mode position.

FIG. 3B illustrates mode sleeve 112 of mode shift mechanism 52 in its second mode position wherein mode sleeve 112 locks second sun gear 90 for common rotation with rear output shaft 50. To move mode sleeve 112 from its first mode position to its second mode position, power-operated actuator assembly 116 functions to retract actuation member 117 relative to actuator spring 124 in opening 126a of plunger 126. This enables return spring 122 to decompress, thereby forcing shift fork 118 to move to the right, relative to the view illustrated. When shift fork 118 travels to the right, arm 128 applies an axial force to annular channel 134 on mode sleeve 112. This causes spline teeth 112a on mode sleeve 112 to slide into simultaneous locking engagement with external clutch teeth 142 on rear output shaft 50 and clutch teeth 113 on second sun gear 90. To subsequently return mode sleeve 112 to its first mode position, actuator assembly 116 is actuated such that actuation member 117 is again extended into opening 126a of plunger 126. Upon extension of actuation member 117, flange 140 on shift rail 120 engages second finger 132 of shift fork 118 and overcomes the bias provided by return spring 122. Shift fork 118 is thereby forced to the left, relative to the views illustrated. This, in turn, causes mode sleeve 112 to move out of meshed engagement with clutch teeth 142 on rear output shaft 50.

It should be appreciated that return spring 122 and actuation spring 124 provide a biased mode shift mechanism 52. Specifically, return spring 122 continuously biases shift fork 118 toward its second mode position, as illustrated in FIG. 3B. Therefore, once actuator assembly 116 retracts displaceable actuation member 117 from actuator spring 124, return spring 122 forces shift fork 118 to move to the right which, in turn, forces shift rail 120 to move to the right. This continuous bias is beneficial in a blocking event, wherein teeth 112a on mode sleeve 112 are initially blocked from sliding into meshed engagement with clutch teeth 142 on rear output shaft 50. Additionally, when actuator assembly 116 is actuated, actuator spring 124 biases plunger 126 and, therefore, shift rail 120 toward the first position. Once actuator assembly 116 extends displaceable actuation member 117 to compress actuator spring 124, plunger 126 applies an axial force to shift rail 120. This is beneficial in a blocking event, wherein mode sleeve 112 is initially blocked from disengaging clutch teeth 142 on rear output shaft 50. Therefore, it should be appreciated that transfer case 40 of the present invention provides a simple, sensor free, mode shift mechanism 52 capable of overcoming delayed or blocked shift events.

Figure 4:
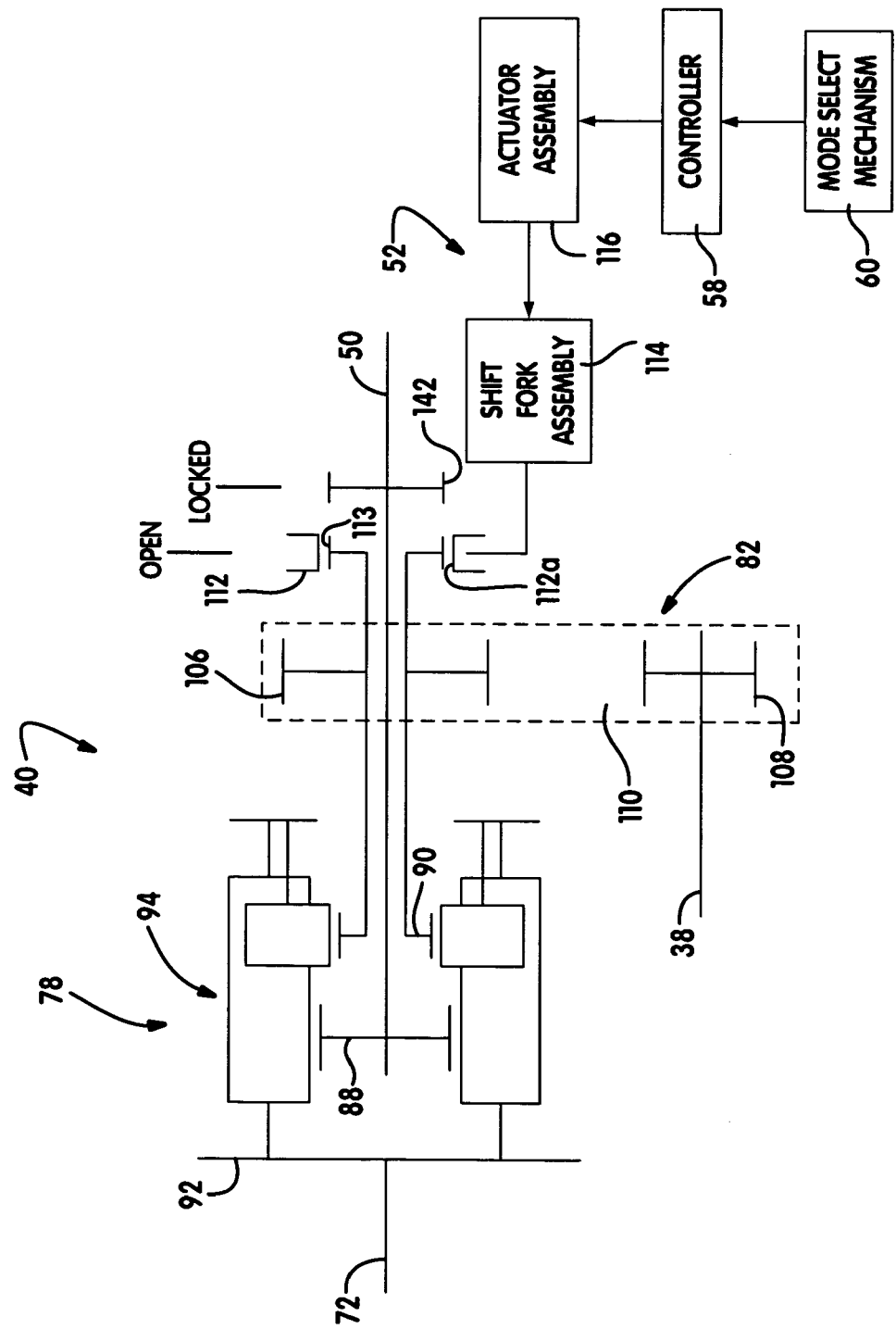
FIG. 4 is a schematic illustration of the electrically-shifted full-time four-wheel drive transfer case shown in FIG. 2 with its mode shift system shown in block format.

FIG. 4 is basically a schematic illustration showing full-time four-wheel drive transfer case 40 of FIG. 2 with the components associated with mode shift mechanism 52 shown in block format. As will be appreciated from the detailed disclosure previously provided, block 114 is representative of the components disclosed for the shift fork assembly which functions to move mode sleeve 112 between its first and second mode positions. Likewise, block 116 is representative of the components/devices disclosed for the power-operated actuator assembly which includes electrically-actuated linear actuator 125. Electric control signals from controller 58 generated in response to mode signals from mode select mechanism 60 are supplied to linear actuator 125 of actuator assembly 116 for ultimately controlling movement of mode sleeve 112 between its two distinct mode positions.

Figure 5:
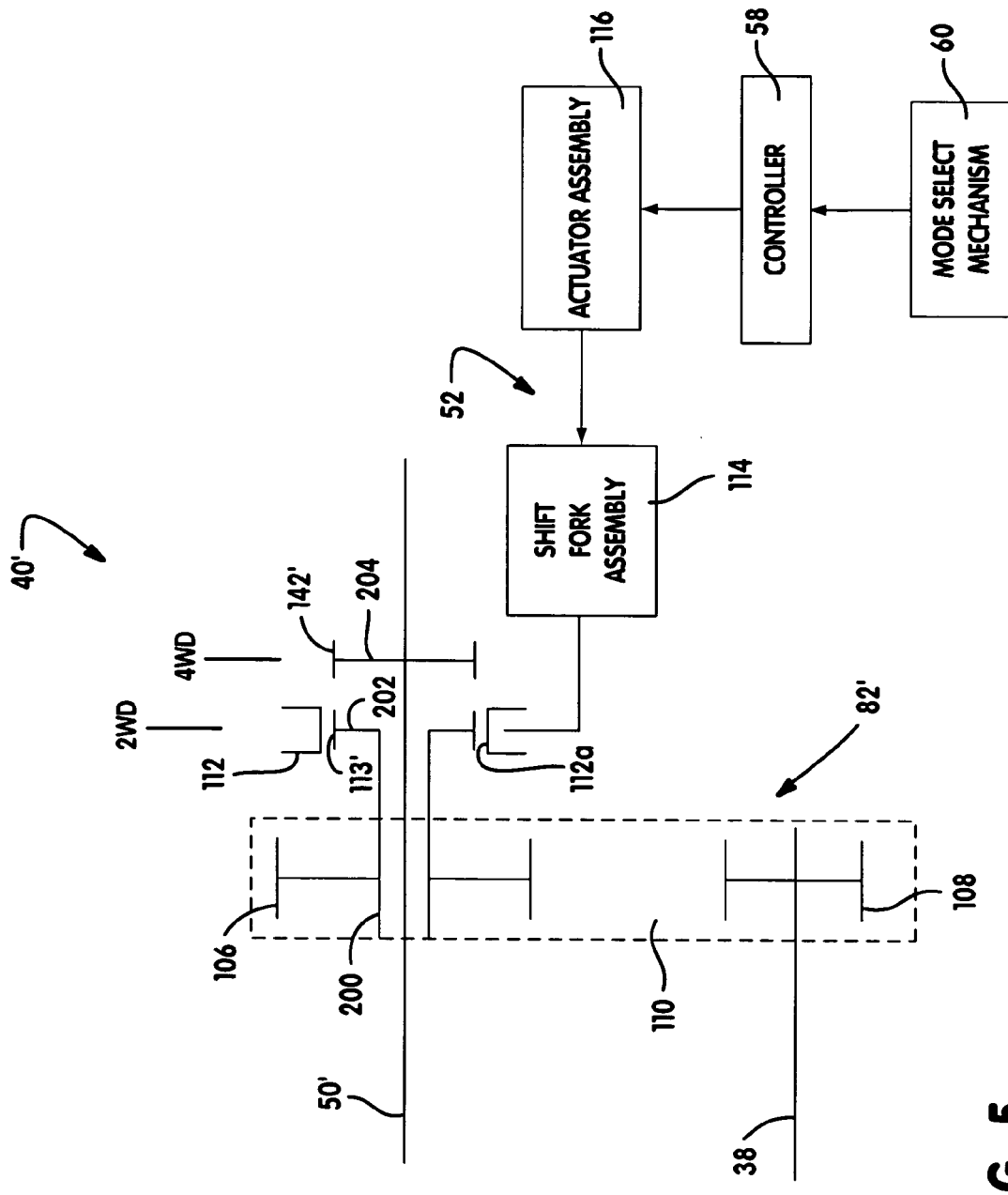
FIG. 5 is a schematic illustration of an electrically-shifted part-time four-wheel drive transfer case according to an alternative embodiment of the present invention.

FIG. 5 is a schematic illustration of a non-differential version of transfer case 40, hereinafter identified by reference numeral 40'. Transfer case 40' differs from transfer case 40 in that differential 78 is eliminated such that rear output shaft 50' is now adapted to additionally act as the input shaft such that it is driven by engine 26 and transmission 28. Also, first sprocket 106 is shown fixed to a stub shaft 200 that is rotatably supported on rear output shaft 50'. A clutch ring 202 having external clutch teeth 113' is provided on stub shaft 200 with which internal clutch teeth 112a of mode sleeve 112 are constantly meshed. In addition, a clutch ring 204 is driven by rear output shaft 50' and has external clutch teeth 142' formed thereon. Mode sleeve 112 is shown located in a first or 2WD position whereat its clutch teeth 112a are disengaged from clutch teeth 142' on clutch ring 204. With mode sleeve 112 located in its 2WD position, transfer mechanism 82' is uncoupled from driven connection with rear output shaft 50' such that all drive torque is delivered to rear driveline 24 for establishing a two-wheel drive mode.

Actuation of actuator assembly 116 is operable to cause shift fork assembly 114 to move mode sleeve 112 from its 2WD position into a second or 4WD position whereat its clutch teeth 112a also engage external clutch teeth 142' on clutch ring 204. As such, transfer mechanism 82' is now driven by rear output shaft 50' for establishing a locked or part-time four-wheel drive mode. As mentioned, the dual action spring biasing arrangement provided by shift fork assembly 114 provides a bi-directional tooth block releasing function to ensure proper positioning of mode sleeve 112 in one of its two distinct mode positions.

Figure 6:
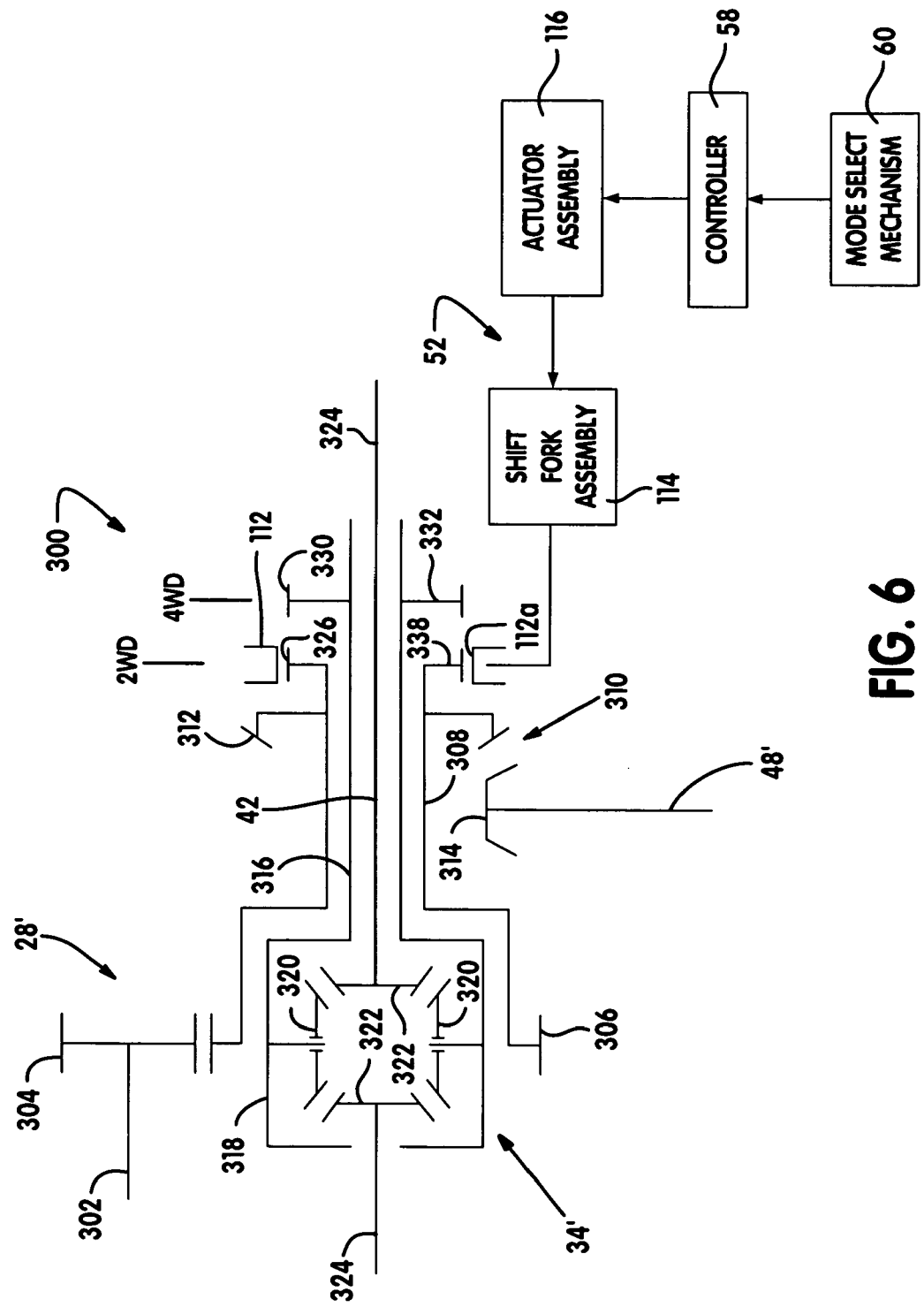
FIGS. 6 through 8 illustrate various embodiments of a power take-off unit equipped with the electrically-shifted mode shift system of the present invention.

Another type of power transmission assembly, commonly referred to as a power take-off unit 300, is shown in FIG. 6 for use with a transverse (i.e., east-west) powertrain instead of the longitudinal (i.e., north-south) powertrain shown in FIG. 1. As seen, an output shaft 302 of a transaxle 28' has an output gear 304 driving a drive gear 306 that is fixed to a transfer shaft 308. A right-angled gearset 310 transmits drive torque from transfer shaft 308 to rear drive shaft 48' for normally supplying motive power to rear axle assembly 44. Gearset 310 is shown to include a ring gear 312 fixed for rotation with transfer shaft 308 that is meshed with a pinion gear 314 fixed to drive shaft 48'. As seen, mode sleeve 112 is arranged to transfer drive torque from transfer shaft 308 through a second transfer shaft 316 to a carrier 318 associated with front differential unit 34'. Differential unit 34' is shown to include pinion gears 320 rotatably supported on pins fixed to carrier 318 and which mesh with first and second side gears 322 that are fixed to front axleshafts 324 for driving front wheels 30. In a manner similar to that shown previously, mode shift mechanism 52 is again operable to move mode sleeve 112 between 2WD and 4WD mode positions for establishing the two-wheel drive and locked four-wheel drive modes. In this arrangement, drive torque is normally delivered to the rear driveline but is selectively transferred to the front driveline via actuation of mode shift mechanism 52. In the 2WD position, mode sleeve teeth 112a are only meshed with clutch teeth 326 on a clutch ring 328 fixed for rotation with transfer shaft 308. However, movement of mode sleeve 112 to its 4WD position causes its teeth 112a to additionally move into engagement with clutch teeth 330 on a clutch ring 332 fixed for rotation with second transfer shaft 316.

Figure 7:
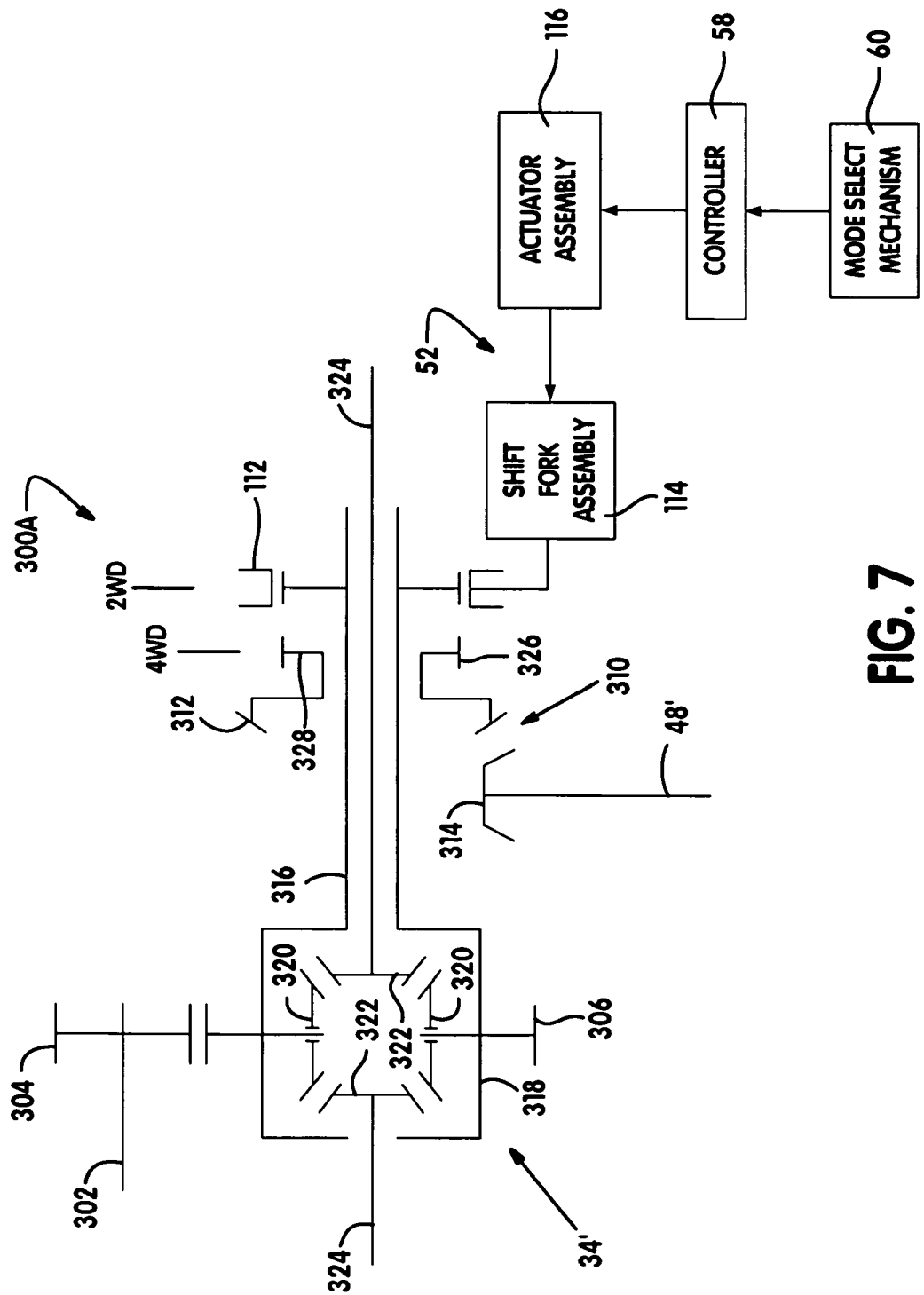

FIG. 7 illustrates a power take-off unit 300A that is generally similar to power take-off unit 300 of FIG. 6 except that drive torque is normally delivered to the front driveline and is only transmitted to the rear driveline via actuation of mode shift mechanism 52. Thus, power take-off unit 300A is used in a front-wheel drive vehicle to provide a two-wheel drive mode and a locked four-wheel drive mode wherein drive torque is delivered to the rear wheels. As seen, mode sleeve 112 is operably disposed between transfer shaft 316 and ring gear 312.

Figure 8:
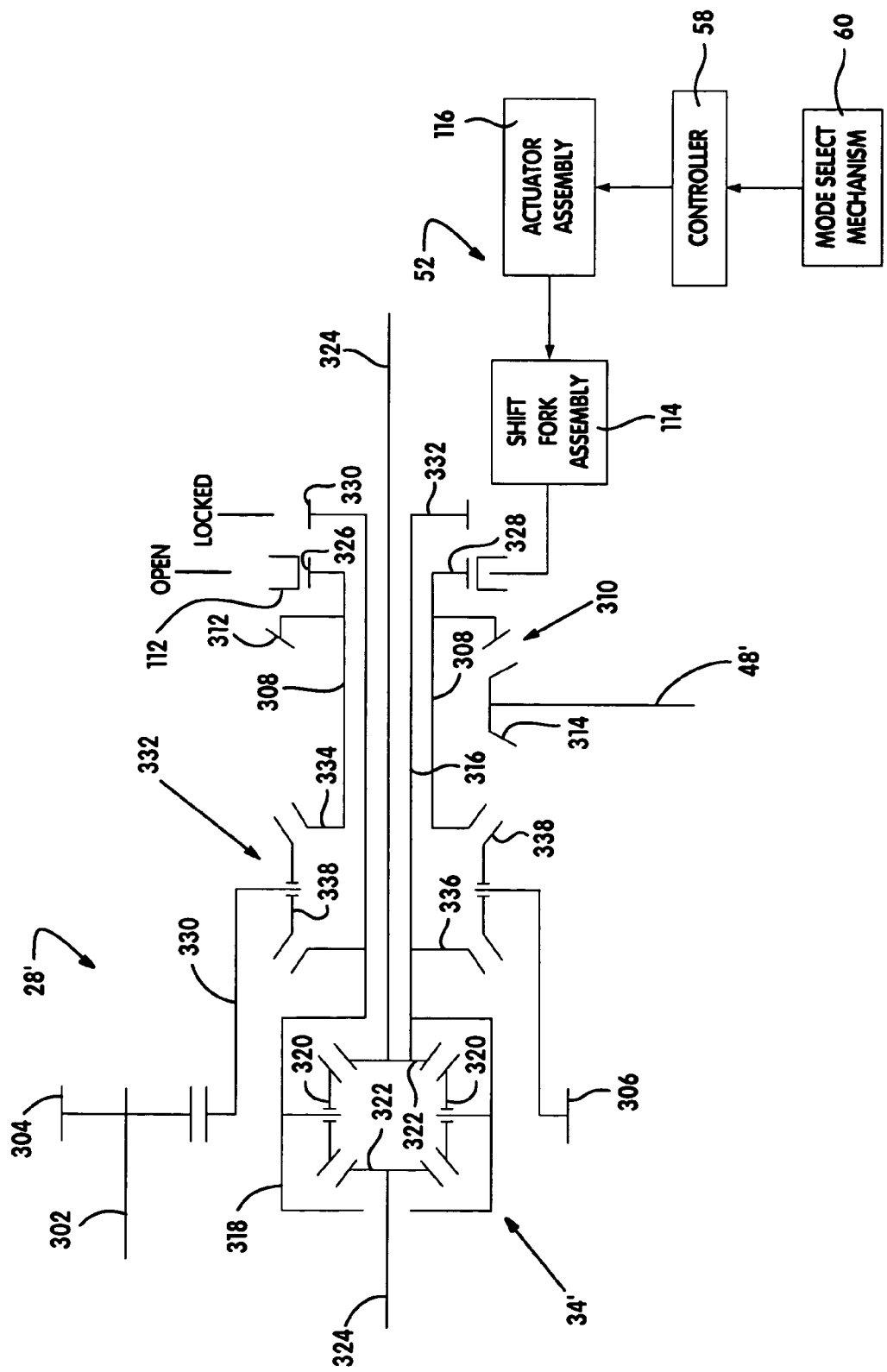

In addition to the part-time four-wheel drive power take-off units shown in FIGS. 6 and 7, a full-time four-wheel drive version is shown in FIG. 8 and is identified by reference numeral 300B. In this arrangement, drive gear 306 drives a carrier 330 of a center differential unit 332 having a first side gear 334 fixed to first transfer shaft 308, a second side gear 336 fixed to second transfer shaft 316, and pinion gears 338 rotatably supported from carrier 330 which are meshed with side gears 334 and 336. As seen, mode sleeve 112 is operably disposed between first transfer shaft 308 and second transfer shaft 316. As similar to operation of full-time transfer case 40 of FIG. 4, mode shift mechanism 52 is again operable to move mode sleeve 112 between its two distinct open and locked mode positions in response to actuator assembly 116 receiving electric command signals from controller 48.

Figure 9:
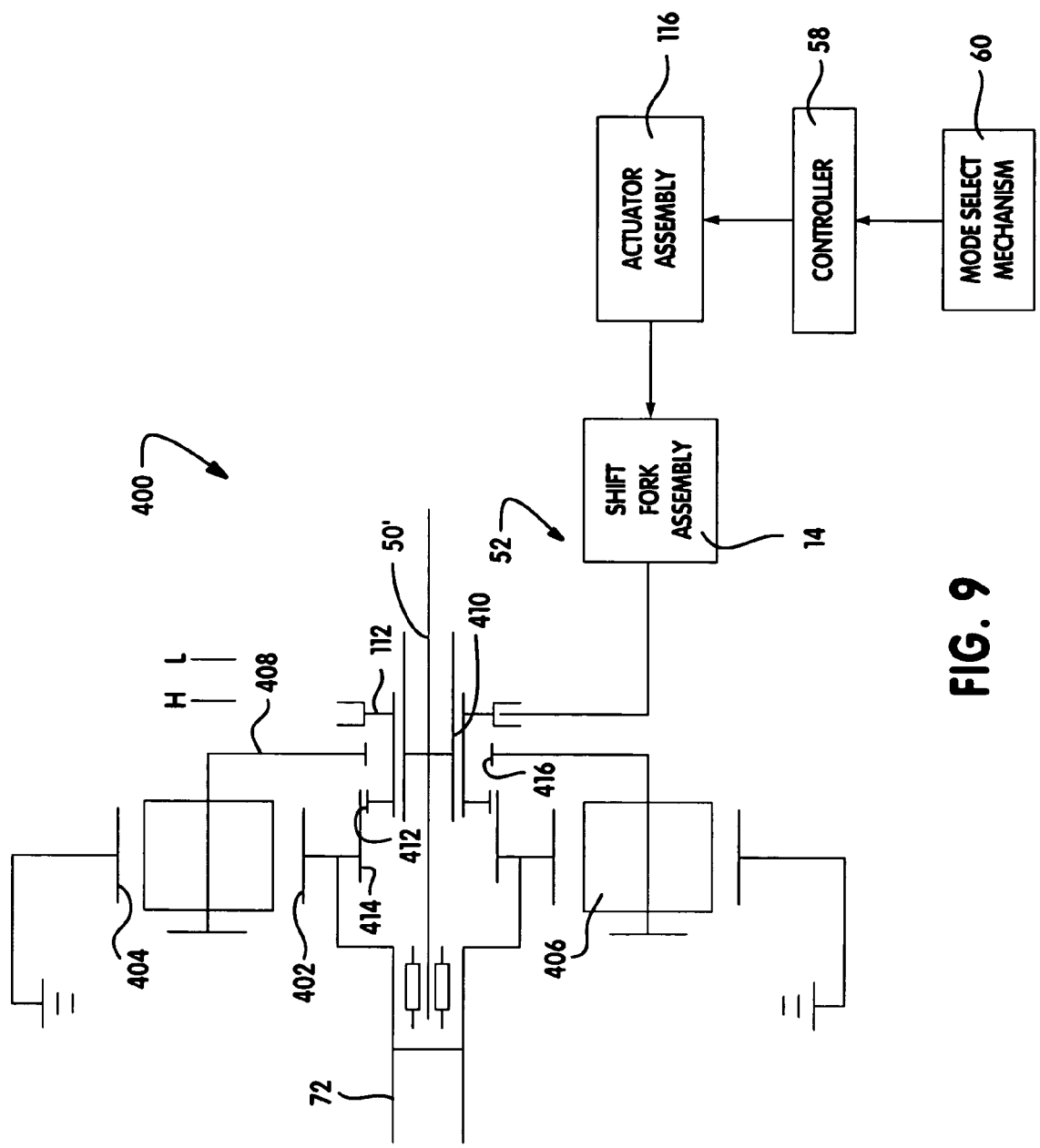
FIG. 9 is a schematic illustration of an electrically-shifted two-speed reduction unit associated with a transfer case of the present invention.

FIG. 9 illustrates installation of a two-speed reduction unit 400 between input shaft 72 and rear output shaft 50' in transfer case 40' shown in FIG. 5. Specifically, reduction unit 400 includes a sun gear 402 driven by input shaft 72, a fixed ring gear 404 and planet gears 406 meshed with both sun gear 402 and ring gear 404. Planet gears 406 are rotatably supported on a carrier 408 which is driven at a reduced speed in response to rotation of input shaft 72. Mode sleeve 112 is shown coupled for rotation with, and axial movement on, rear output shaft 50' via a splined connection 410. Mode sleeve 112 includes clutch teeth 412 that are typically meshed with clutch teeth 414 formed on one of input shaft 72 and sun gear 402 so as to normally establish a direct drive connection between input shaft 72 and rear output shaft 50' when mode sleeve is located in a first or high-range "H" position. In contrast, mode sleeve 112 can be moved axially to a second or low-range "L"

position whereat its clutch teeth 412 are released from engagement with clutch teeth 414 and yet are engaged with clutch teeth 416 associated with carrier 408. Engagement of clutch teeth 412 and 416 establishes a reduced speed drive ratio connection between input shaft 70 and rear output shaft 50' via coupling of carrier 408 with rear output shaft 50' through mode sleeve 112.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A power transmission assembly for use in a motor vehicle, comprising:
    a first rotary member;
    a second rotary member; and
    a shift mechanism for coupling said first and second rotary members, said shift mechanism including a shift sleeve driven by said first rotary member and moveable between a first position released from coupled engagement with said second rotary member and a second position engaging said second rotary member, a shift rail slidably supported in a housing, a shift fork slidably supported on said shift rail and engaging said shift sleeve, a power-operated shift actuator, a first biasing member disposed between said shift actuator and a first end of said shift rail for selectively biasing said shift rail in a first direction, a second biasing member disposed between said shift rail and said housing for biasing said shift fork in a second direction, and a plunger axially moveable in response to actuation of said shift actuator and operably located between said shift rail and said first biasing member, wherein said first biasing member is a coil spring disposed between said shift actuator and said plunger and operable for biasing said plunger into engagement with said shift rail upon actuation of said shift actuation.

2. The power transmission assembly of claim 1 wherein said shift rail includes a shoulder for selectively engaging said shift fork and driving said shift fork in said first direction.

3. The power transmission assembly of claim 1 wherein said second biasing member includes a coil spring.

4. The power transmission assembly of claim 1 wherein said shift actuator includes an output member colinearly aligned with said shift rail and moveable between a retracted position and an extended position, said output member is operable in its extended position to compress said coil spring and cause said plunger to forcibly displace said shift rail in said first direction in opposition to the biasing of said second biasing member for locating said shift sleeve in said first position.

5. The power transmission assembly of claim 4 wherein movement of said output member from its extended position to its retracted position releases compression of said coil spring and permits said second biasing member to forcibly displace said shift rail in said second direction for moving said shift sleeve from its first position to its second position.

6. The power transmission assembly of claim 5 wherein said first end of said shift rail is disposed in a first housing aperture and a second end of said shift rail is disposed in a second housing aperture, wherein said shift fork has a first portion slidably mounted on an intermediate portion of said shift rail and a second portion engaging said shift sleeve, wherein said coil spring is disposed between said output member and said plunger within said first housing aperture, and wherein said second biasing member is a second coil spring surrounding said shift rail and disposed between said housing adjacent said second housing aperture and said first portion of said shift fork for biasing said shift fork against a stop flange associated with said shift rail.

7. A power transmission assembly, comprising:
    a housing;
    a first shaft rotatably supported by said housing;
    a second shaft rotatably supported by said housing;
    a shift sleeve for selectively coupling said first and second shafts;
    a linear shift actuator in operable communication with said shift sleeve for initiating said selective coupling; and
    a shift mechanism for providing said operable communication, said shift mechanism including:
        a shift rail slidably supported by said housing;
        a shift fork slidably supported on said shift rail and operably communicating with said shift sleeve;
        a first biasing member disposed between said linear shift actuator and a first portion of said shift rail for selectively biasing said shift rail in a first direction in response to said linear shift actuator being actuated;
        a second biasing member disposed on a second portion said shift rail between said housing and said shift fork for biasing said shift fork in a second direction; and
        a plunger disposed between said first biasing member and said first portion of said shift rail and operable to drive said shift rail in said direction upon actuation of said shift actuator.

8. The power transmission assembly of claim 7 wherein said shift rail includes a shoulder for selectively engaging said shift fork and driving said shift fork in said first direction.

9. The power transmission assembly of claim 7 wherein said second biasing member includes a coil spring.

10. The power transmission assembly of claim 7 wherein said housing includes a throughbore slidably supporting said first portion of said shift rail and a blind bore slidably supporting said second portion of said shift rail.

11. The power transmission assembly of claim 7 wherein said first biasing member includes a coil spring disposed between said linear shift actuator and said plunger for biasing said plunger into engagement with said first portion of said shift rail upon actuation of said linear shift actuator.

12. The power transmission assembly of claim 11 wherein said linear shift actuator includes an output member colinearly aligned with said shift rail and moveable between a retracted position and an extended position, said output member is operable in its extended position to compress said coil spring and cause said plunger to forcibly displace said shift rail in said first direction in opposition to the biasing of said second biasing member for locating said shift sleeve in a first position.

13. The power transmission assembly of claim 12 wherein movement of said output member from its extended position to its retracted position releases compression of said coil spring and permits said second biasing member to forcibly displace said shift rail in said second direction for moving said shift sleeve from its first position to a second position.

14. The power transmission assembly of claim 13 wherein said first portion of said shift rail is disposed in a first housing aperture and said second portion of said shift rail is disposed in a second housing aperture, wherein said shift fork has a first portion slidably mounted on an intermediate portion of said shift rail and a second portion engaging said shift sleeve, wherein said coil spring is disposed between said output member and said plunger within said first housing aperture, and wherein said second biasing member is a second coil spring surrounding said shift rail and disposed between said housing adjacent said second housing aperture and said first portion of said shift fork for biasing said shift fork against a stop flange associated with said shift rail.

15. A power transmission assembly, comprising:
a housing;
a first shaft rotatably supported by said housing;
a second shaft rotatably supported by said housing;
a shift sleeve for selectively coupling said first and second shafts;
a linear shift actuator in operable communication with said shift sleeve for initiating said selective coupling; and
a shift mechanism for providing said operable communication, said shift mechanism including:
a shift rail slidably supported by said housing;
a shift fork slidably supported on said shift rail and operably communicating with said shift sleeve;
a first biasing member disposed between said linear shift actuator and a first portion of said shift rail for selectively biasing said shift rail in a first direction in response to said linear shift actuator being actuated;
a second biasing member disposed on a second portion of said shift rail between said housing and said shift fork for biasing said shift fork in a second direction that is substantially opposite to said first direction; and
an axially moveable plunger disposed between said first biasing member and said first portion of said shift rail, said plunger engaging said shift rail and driving said shift rail in said first direction upon actuation of said shift actuator.

16. The power transmission assembly of claim 15 further including a bi-directionally displaceable member coupled to said linear shift actuator and in engagement with said first biasing member.

17. The power transmission assembly of claim 15 wherein said first biasing member includes a coil spring disposed between said plunger and said shift actuator for biasing said plunger into engagement with said first portion of said shift rail upon actuation of said shift actuator.

18. The power transmission assembly of claim 15 wherein said shift rail includes a shoulder for selectively engaging said shift fork and driving said shift fork in said first direction.

19. The power transmission assembly of claim 15 wherein said second biasing member includes a coil spring.

20. The power transmission assembly of claim 15 wherein said linear shift actuator includes an electric motor operable to linearly drive a ball screw mechanism.

21. A power transfer device for use in a motor vehicle having a powertrain and first and second drivelines, comprising:
an input driven by the powertrain;
a first output interconnecting said input to the first driveline;
a second output connected to the second driveline;
a mode clutch operably disposed between said second output and one of said input and said first output;
a mode shift mechanism operable in a first mode position to shift said mode clutch into a first mode and in a second mode position to shift said mode clutch into a second mode, said mode shift mechanism including:
a shift sleeve for selectively engaging said mode clutch;
a linear shift actuator in operable communication with said shift sleeve;
a shift rail supported for sliding movement;
a shift fork slidably supported on said shift rail and operably communicating with said shift sleeve;
a first biasing member disposed between said linear shift actuator and a first end of said shift rail for selectively biasing said shift rail in a first direction in response to actuation of said linear shift actuator;
a second biasing member disposed on said shift rail opposite said shift fork from said first end and between said housing and said shift fork for biasing said shift fork in a second direction that is substantially opposite to said first direction; and
an axially moveable plunger disposed at an end of said shift rail, said plunger engaging said shift rail and driving said shift rail in said first direction upon actuation of said shift actuator.

22. The power transfer device of claim 21 defining a power take-off unit having a first differential unit as said input, a drive unit as said first output, and a second differential unit as said second output, said first differential unit including an input member driven by the powertrain, a first output gear driving said drive unit, and a second output gear driving said second differential unit, and wherein said mode clutch is operably disposed between said first and second output gears of said first differential unit.

23. The power transfer device of claim 21 further comprising:
a control system having a mode selector capable of generating a mode signal indicative of the mode selected; and
a control unit receiving said mode signal and actuating said shift actuator in response thereto for moving said shift sleeve to a mode position corresponding to the selected mode.

24. The power transfer device of claim 21 defining a transfer case with an input shaft as said input, a first output shaft as said first output, and a second output shaft as said second output, and further including a transfer unit driven by said first output shaft with said mode clutch operably disposed between said transfer unit and said second output shaft.

25. The power transfer device of claim 21 defining a power take-off unit having a first transfer shaft as said input, a right-angled drive unit driven by said transfer shaft as said first output, and a second transfer shaft driving a differential associated with the second driveline as said second output, and wherein said mode clutch is operably disposed between said first and second transfer shafts.

26. The power transfer device of claim 21 defining a power take-off unit having differential carrier of a differential unit associated with the first driveline as said first output and a right-angled drive unit as said second output, and wherein said mode clutch is operably disposed between said differential carrier and said drive unit.

27. A power transmission assembly, comprising:
a housing;
first and second rotary members rotatably supported by said housing;
a mode clutch operable in a first mode position to permit relative rotation between said first and second rotary members and in a second mode position to prevent relative rotation between said first and second rotary members; and
a mode shift mechanism operable for moving said mode clutch between said first and second mode positions, said mode shift mechanism including:
a shift rail slidably supported by said housing and having a first end portion retained in a first housing aperture and a second end portion retained in a second housing aperture;

a shift fork having a first segment engaging said mode clutch and a second segment slidably supported on an intermediate portion of said shift rail;

a power-operated shift actuator having an output member colinearly aligned with said shift rail and disposed for bi-directional movement between first and second positions within said first housing aperture, a plunger engageable with said first portion of said shift rail, and an actuator spring disposed between said output member and said plunger; and a return spring disposed on said intermediate portion of said shift rail between said housing adjacent said second housing aperture and said second segment of said shift fork and operable for biasing said shift fork against a flange portion of said shift rail.

28. The power transmission assembly of claim 27 wherein said mode clutch includes a mode sleeve driven by said first rotary member and axially moveable between said first and second mode positions, and wherein said first portion of said shift fork is disposed in a groove formed in said mode sleeve such that said mode sleeve moves in coordination with sliding movement of said shift rail.

29. The power transmission assembly of claim 27 defining a transfer case having a first output shaft as said first rotary member, a second output shaft as said second rotary member, and a transfer unit coupled to said second output shaft, and wherein said mode clutch is operably disposed between said first output shaft and said transfer unit for selectively establishing a releasable driving connection therebetween.

30. The power transmission assembly of claim 27 defining a transfer case having an input shaft, a differential having an input component driven by said input shaft and first and second output components, said first output component is coupled to said first rotary member and said second output component is coupled to said second rotary member, and wherein said mode clutch is operable in its first mode position to establish a differential mode and is operable in its second mode position to establish a non-differential mode.

31. The power transmission assembly of claim 27 wherein said output member of said shift actuator is operable in its first position to compress said actuator spring and cause said plunger to forcibly displace said shift rail in a first direction in opposition to the biasing of said return spring, and wherein said output member of said shift actuator is operable in its second position to release compression of said actuator spring which permits said return spring to forcibly displace said shift rail in a second direction.

32. The power transmission assembly of claim 31 wherein movement of said shift rail in said first direction in response to movement of said output member to its first position causes said shift rail to locate said mode clutch in its first mode position, and wherein movement of said shift rail in said second direction in response to movement of said output member to its second position causes said shift rail to locate said mode clutch in its first position.

33. The power transmission assembly of claim 31 further comprising:

a control system having a mode selector capable of generating a mode signal; and a control unit receiving said mode signal and actuating said shift actuator in response to said mode signal for moving said output member between its first and second positions.

34. The power transmission assembly of claim 31 wherein movement of said shift rail in said first direction in response to movement of said output member to its first position causes said shift rail to locate said mode clutch in its first mode position, and wherein movement of said shift rail in said second direction in response to movement of said output member to its second position causes said shift rail to locate said mode clutch in its second mode position.

* * * * *